UNITED STATES PATENT OFFICE.

HENRY W. JOHNS, OF NEW YORK, N. Y.

NON-CONDUCTING SHEET OR MASS.

SPECIFICATION forming part of Letters Patent No. 441,163, dated November 25, 1890.

Application filed December 12, 1889. Serial No. 333,560. (No specimens.)

*To all whom it may concern:*

Be it known that I, HENRY WARD JOHNS, a citizen of the United States, and a resident of New York city, in the county of New York and State of New York, have invented certain new and useful Improved Non-Conducting Sheet or Mass, of which the following is a specification.

My invention relates to a new and useful compound sheet or mass peculiarly adapted for use as a non-conductor of heat or cold and as a filling for safes, refrigerators, &c., and also as a sound-deadening lining for partitions, floors, walls, &c., and for other uses to which similar products are put; and it consists in a compound or mixture somewhat resembling that described in my United States Letters Patent No. 385,120, dated June 26, 1888. In that patent I recite a discovery made, so far as I am aware, by myself of the peculiar "adhesive attraction" which exists between the tentacle-like lashes or barbs of common sponge and the fine silk-like fibers of fibrous asbestus; and in that invention I avail myself of that peculiar quality in the manufacture of the products recited in said patent. I have found, however, that for certain purposes very useful products can be made which in some respects are as desirable as those made from fibrous asbestus and sponge, described in that patent—to wit, by the employment of comminuted sponge in conjunction with other fibrous minerals or mineral products which either do not have the peculiar adhesive attraction before referred to or which have it in so small a degree that the resulting products would not be characterized thereby, and thus hardly within the scope of that patent. For example, I have found that powdered minerals—such as oxide of zinc, chalk, &c.— when mixed with the disintegrated sponge, with or without the addition of asbestus or other fibrous minerals, form a desirable filling or cementing material or compound, which may be used in bulk (dry) or wetted to form sheets, cylinders, &c., and may also be molded into such forms as desired—that is to say, I have discovered that by the use of various substances other than fibrous asbestus in conjunction with the sponge I can secure the advantages of great porosity, bulk relative to weight, adhesive elasticity, and fire-proof qualities at much less cost than by the employment of fibrous asbestus and with much less labor in the manufacture of the products.

I proceed as follows: I take sponge and either pick it apart, cut, or shred it, thus producing it in fibrous forms or in small pieces. I then take minerals or mineral products— such as agolite, actinolite, chrysolite, hornblende, mineral wool, and the like, or any two or more of them, if preferred—in a fibrous condition, or metallic turnings or filings, the oxides of the metals, &c. Then I thoroughly mix the comminuted sponge with these bodies, either by depositing the sponge and the said bodies in successive layers, thus forming a wadding-like mass, or by mechanically mixing them, as by a picker or otherwise. The resulting mass upon being compressed will be found to have sufficient tenacity to allow it to be handled while being placed in walls, floors, partitions, and for the like uses, and when placed between the walls of safes and in like places, and preferably rammed down slightly, will maintain its position, permanently filling the space intended to be filled by it because of its elasticity. It may also be wetted with any suitable sizing or adhesive substance—such as silicate of soda, rubber solution, starch, glue, and the like—and then pressed into such shapes or forms—flat, curved, or cylindrical—as desired.

The non-inflammable mineral bodies will render the product practically fire-proof and the sponge will render it exceedingly porous or full of air-spaces. The sponge may be treated with silicate of soda or the like substance to render it additionally fire-proof, if desired, and the product or the sponge alone before mixing with the other bodies may be treated with disinfecting or antiseptic substances, whereby it will be rendered vermin-proof, thus peculiarly adapting it to architectural and other sanitary purposes. It may also be waterproofed by treatment with oil or its equivalent, thus repelling moisture and avoiding dampness.

I do not limit myself to the specific mineral substances or products above referred to, because there are other substances which possess the same characteristics, such as the ordinary low grades or brittle asbestus, also asbestus of such short fiber that the peculiar adhesive attraction between the fibers of asbestos and the fibers of sponge, as recited in my said former patent, does not obtain.

Another method by which my product may be made is to pulp the comminuted sponge and the said bodies with water or other suitable liquid in an ordinary paper-maker's apparatus, either both together in the same vat, whereby they will be easily and thoroughly mixed, and then being laid out to dry will, when dry, present a uniformly mixed mass, or they may be pulped in separate vats and then mixed by pouring them out and spreading them in superposed layers.

I sometimes, instead of comminuting the sponge dry, prefer to dampen it during or prior to the disintegrating process, whereby its powdering is prevented and its fibrous characteristics more fully preserved. For certain products, however, it is necessary to divide the sponge into very small pieces. This I accomplish by grinding in a dry state, because when subsequently wetted the particles of sponge swell up and attain and partially or wholly retain their enlarged size.

Having described my invention, I claim—

1. The herein-described composition of matter, consisting, essentially, of fibrous or comminuted sponge and hornblende, mineral wool, the oxides of the metals, and like bodies, substantially as set forth.

2. The herein-described composition of matter, consisting, essentially, of fibrous or comminuted sponge, hornblende, mineral wool, the oxides of the metals, and the like bodies, and antiseptic or disinfecting material, substantially as set forth.

3. The herein-described composition of matter, consisting, essentially, of fireproofed sponge and hornblende, mineral wool, the oxides of the metal, and like bodies, substantially as set forth.

4. The herein-described composition of matter, consisting, essentially, of waterproofed sponge and hornblende, mineral wool, the oxides of the metals, and the like bodies, substantially as set forth.

Signed at New York, in the county of New York and State of New York, this 10th day of December, A. D. 1889.

HENRY W. JOHNS.

Witnesses:
PHILLIPS ABBOTT,
FREDERICK SMITH.